(12) United States Patent
Zhang et al.

(10) Patent No.: US 9,967,089 B2
(45) Date of Patent: May 8, 2018

(54) CHANGE-TOLERANT METHOD FOR GENERATING IDENTIFIER FOR COLLECTION OF ASSETS IN COMPUTING ENVIRONMENT USING ERROR-CORRECTION CODE SCHEME

(75) Inventors: Fan Zhang, Beijing (CN); Andrew Augustine Wajs, Hoofddorp (NL)

(73) Assignee: IRDETO B.V., Hoofddorp (NL)

( * ) Notice: Subject to any disclaimer, the term of this patent is extended or adjusted under 35 U.S.C. 154(b) by 1026 days.

(21) Appl. No.: 14/005,223

(22) PCT Filed: Mar. 15, 2011

(86) PCT No.: PCT/CN2011/000417
§ 371 (c)(1),
(2), (4) Date: Aug. 19, 2014

(87) PCT Pub. No.: WO2012/122674
PCT Pub. Date: Sep. 20, 2012

(65) Prior Publication Data
US 2015/0023495 A1    Jan. 22, 2015

(51) Int. Cl.
*G06F 21/00*    (2013.01)
*H04L 9/06*    (2006.01)
(Continued)

(52) U.S. Cl.
CPC ............ *H04L 9/0643* (2013.01); *G06F 11/10* (2013.01); *G06F 21/57* (2013.01); *H04L 2209/34* (2013.01)

(58) Field of Classification Search
CPC ... H04L 9/0643; H04L 2209/34; G06F 21/57; G06F 11/10
See application file for complete search history.

(56) References Cited

U.S. PATENT DOCUMENTS 5,530,757 A * 6/1996 Krawczyk ............. H04L 9/3236
                                              713/161
7,444,582 B1 * 10/2008 Au et al. ....................... 714/784
(Continued)

FOREIGN PATENT DOCUMENTS

CN          1530791 A    9/2004
JP      2005-523481 A    8/2005

OTHER PUBLICATIONS

Examination Report cited in corresponding Canadian Application No. 2,830,110 dated Oct. 24, 2016.
(Continued)

*Primary Examiner* — Jeffrey C Pwu
*Assistant Examiner* — William A Corum, Jr.
(74) *Attorney, Agent, or Firm* — Rimon, P.C.; Marc Kaufman (57) ABSTRACT

A secure and change-tolerant method for obtaining an identifier for a collection of assets associated with a computing environment. Each asset has an asset parameter and the computing environment has a fingerprint based on an original collection of assets and on a codeword generation algorithm on the original collection of assets. The method comprises: retrieving the asset parameters of the collection of assets and processing the retrieved asset parameters to obtain code symbols. An error-correction algorithm is applied to the code symbols to obtain the identifier. The method can be used in node-locking.

34 Claims, 7 Drawing Sheets

(51) Int. Cl.
*G06F 11/10* (2006.01)
*G06F 21/57* (2013.01)

(56) References Cited

U.S. PATENT DOCUMENTS

| | | |
|---|---|---|
| 8,516,269 B1 * | 8/2013 | Hamlet et al. ................ 713/189 |
| 8,667,265 B1 * | 3/2014 | Hamlet et al. ................ 713/150 |
| 8,848,905 B1 * | 9/2014 | Hamlet et al. ................ 380/35 |
| 2003/0188231 A1 | 10/2003 | Cronce |
| 2004/0015748 A1 | 1/2004 | Dwyer |
| 2005/0132357 A1 | 6/2005 | Shell et al. ................ 717/174 |
| 2005/0198645 A1 | 9/2005 | Marr et al. |
| 2005/0234996 A1 * | 10/2005 | Carpentier et al. ........ 707/104.1 |
| 2008/0028474 A1 | 1/2008 | Horne et al. |
| 2008/0098482 A1 * | 4/2008 | Hughes ................ G06F 21/125 726/26 |
| 2009/0049560 A1 * | 2/2009 | Lotspiech ................ 726/32 |
| 2009/0138967 A1 | 5/2009 | Faieta et al. .................... 726/22 |
| 2010/0293270 A1 | 11/2010 | Augenstein et al. ......... 709/224 |
| 2010/0318881 A1 | 12/2010 | Limber |

OTHER PUBLICATIONS

Extended European Search Report cited in corresponding European Application No. 11860843.9 dated Sep. 18, 2014.
Bernard Sklar, "Reed Solomon Codes".
International Search Report and Written Opinion issued in corresponding application No. PCT/CN2011/000417, dated Dec. 8, 2011 (11 pgs).

* cited by examiner

CHANGE-TOLERANT METHOD FOR GENERATING IDENTIFIER FOR COLLECTION OF ASSETS IN COMPUTING ENVIRONMENT USING ERROR-CORRECTION CODE SCHEME

BACKGROUND OF THE INVENTION

The present disclosure relates generally to generating identifiers for a computing environment. More particularly, the present disclosure relates to generating an identifier for a collection of assets in a computing environment, in a change-tolerant manner, using an error-correction scheme.

Many protection technologies for computer systems need a mechanism to robustly identify the system on which a software application is running. This is generally accomplished by reading out device identifiers from various assets of the system, such as hardware devices (motherboard parameters, BIOS, MAC address, hard disk, CD/DVD player, graphics card, I/O controllers) that are integrated into the system. These device identifiers are then combined into an identifier of the system. A simple way to derive such an identifier is by applying an exclusive-or (XOR) to all device identifiers.

As computer hardware parts, or other assets, change, such as due to replacement and repairs, a method to determine the system identifier needs to accommodate occasional changes to the device identifiers. One way of supporting hardware updates is by allowing a small number device identifiers to change while still generating the same system identifier. A known way to achieve this is by recording the unique device identifiers during an initialization phase and, during the identifier calculation phase, comparing the recorded parameters with the actual parameters. If a sufficient match exists, the recorded parameters are used to obtain the system identifier.

There are other methods that derive a system identifier from a collection of contributing pieces of information that may change over time. Although based on different contributing information, such methods also need to accommodate changes to the contributing information without changing the calculated identifier. As in the system described above, the method consists of recording the contributing information, comparing the recorded information with actual information, and enabling use of the system if a sufficient match exists between the actual information and the recorded information.

One problem with such methods is that the comparison of the recorded device identifiers with the retrieved parameters is sensitive to attacks. The presence of the recorded device identifiers is the key enabler for these attacks. It is, therefore, desirable to provide a method of generating a system identifier that is tolerant of changes in the computing environment, while being resistant to malicious attacks.

SUMMARY OF THE INVENTION

In a first aspect, the present disclosure provides a method to obtain an identifier for a current collection of assets associated with a computing environment. The method comprises: obtaining current asset parameters, the current asset parameters being associated with the current collection of assets; processing the current asset parameters and a fingerprint in accordance with a pre-determined function to obtain code symbols, the fingerprint being associated with the computing environment, the fingerprint being based on an original collection of assets of the computing environment; and applying an error-correction algorithm to the code symbols to obtain the identifier.

The pre-determined function can include converting each current asset parameter to at least one hash value to obtain a series of hash values. The pre-determined function can further include mapping the series of hash values to the code symbols in accordance with the fingerprint. The fingerprint can have associated thereto transform parameters; and, mapping the series of hash values to the code symbols can be effected in accordance with the transform parameters. Mapping the series of hash values to the code symbols can include performing an XOR operation between the series of hash values and the transform parameters. At least one of the assets can have associated thereto a challenge-response device; and obtaining the current asset parameters can includes: providing at least one challenge to the challenge-response device; and, receiving, from the challenge-response device, a response for each of the at least one challenge, each response constituting a current asset parameter. The challenge-response device can include at least one of a Physical Unclonable Function device, a dongle, and a smart card. The error-correction algorithm can include a Reed-Solomon error-correcting code.

In a second aspect, the present disclosure provides a method of defining a fingerprint for a computing environment having associated thereto an original collection of assets. The method comprises: generating codeword symbols in accordance with a codeword generation algorithm; and, processing asset parameters and the codeword symbols in accordance with a pre-determined function to obtain the fingerprint, the asset parameters being associated with the original collection of assets.

Generating codeword symbols can include providing an identifier as an input to the codeword generation algorithm. Processing can be preceded by accessing the assets to obtain the asset parameters therefrom. Processing can include converting each asset parameter to at least one hash value to obtain a series of hash values. The fingerprint can include a series of transform parameters; and the pre-determined function can map the series of hash values to the series of transform parameters in accordance with the codeword symbols. Processing can be preceded by obtaining the asset parameters. At least one of the assets can have associated thereto a challenge-response device; and obtaining the asset parameters can include: providing at least one challenge to the challenge-response device; and receiving, from the challenge-response device, a response for each of the at least one challenge, each response constituting an asset parameter. The challenge-response device includes at least one of a Physical Unclonable Function device, a dongle, and a smart card. The codeword generation algorithm includes Reed-Solomon error-correction code.

BRIEF DESCRIPTION OF THE DRAWINGS

Other aspects and features of the present disclosure will become apparent to those ordinarily skilled in the art upon review of the following description of specific embodiments in conjunction with the accompanying figures.

Embodiments of the present disclosure will now be described, by way of example only, with reference to the attached Figures.

DETAILED DESCRIPTION OF THE PREFERRED EMBODIMENTS

The present disclosure provides a secure and change-tolerant method that calculates a computing environment identifier based on retrieved asset parameters and an error-correction fingerprint associated with the computing environment. The identifier can be used to affect or determine the functionality of applications running in the computing environment.

For the purpose of the present disclosure, "change-tolerant" is analogous to fault-tolerant and variation-tolerant, and is meant to indicate that the identifier can be obtained even when some assets of the computing environment have been changed subsequent to the error-correction fingerprinting of the computing environment.

As used herein, an "asset" is any data, application, device, node or other component of a computing environment. Assets generally include hardware (e.g. servers and switches), software (e.g. mission critical applications and support systems) and confidential information. The terms "computing environment" and "computer system" are used herein interchangeably, and are intended to encompass single computers and other devices including a processor, distributed computing systems, components thereof, data stored or otherwise associated therewith, and including the data associated with users of such computer systems, attached or accessible peripheral devices, software applications and operating systems, and combinations thereof. As used herein, "asset parameter" means an assigned or determined parameter that is limited in occurrence for a given class of asset, situation, or area. Asset parameters may be unique or may exclusively identify an asset at least at the time the parameter is assigned or determined. Asset parameters can be expressed as, for example, numbers, symbols, strings of numbers and characters, or functions. In other scenarios, asset parameters may not be unique but combinations of asset parameters can be.

An example system in which the present method can be used is a computer (computing environment) that has a number of peripheral devices each having a more or less unique device identifier, such as a serial number or other assigned asset parameter. Generally, such device identifiers are assigned to a device by the manufacturer. The method also can be applied to a network of embedded microcontrollers in which each microcontroller has a unique identifier. Such configurations commonly occur in more complex systems (e.g. airplanes, cars, industrial machines) that are repaired by replacing entire microcontroller modules. In such machines it may be beneficial to link the firmware for the controllers to the particular networked set. Data sources associated with, or stored on, a computer system can also be considered assets. Examples include contact lists, user preference settings, name, address, dates or other parameters that change relatively infrequently. Asset parameters can be obtained by applying a function to parameters associated with one or more assets. For example, an asset parameter may result from a function that takes parameters associated with computer memory, a particular application, or a collection of files as input. Certain asset parameters may also require user input (e.g. a password, an answer to a question (e.g., favorite color, mother's maiden name etc.), the inserting of a removable data source or the scanning of a fingerprint) in order to become available for processing by the method described herein. Further, some assets may have no asset parameter associated thereto. As such, an absence of asset parameter can be considered a valid input when defining an error-correcting fingerprint and when determining an identifier of a computing environment.

The present disclosure uses concepts from the technical field of error-correcting codes (which can also be referred to as error-correction codes) that enable the reliable transmission of data over an unreliable communication link. The main variants of (Forward) Error Correcting codes (FEC) are block codes that operate on fixed blocks of data and convolution codes that operate on streams of data. In several applications these two types of codes are combined to achieve data rates that are close to the Shannon limit. Turbo codes or LDPC codes (low-density parity-check codes) can be used for increased performance. Although any error-correcting coding can be applied to the present disclosure, the description of some embodiments of the disclosure will be based on linear codes such as the Maximum Distance Separable codes of which Reed Solomon codes are well known examples. Error-correcting codes other than Maximum Distance Separable codes can be used without departing from the scope of the present disclosure.

As is known in the art, an error-correcting block code can map a message x consisting of k symbols to a codeword c consisting of n symbols. The message may be denoted by $(x_1, x_2, \ldots, x_k)$, and the codeword by $(c_1, c_2, \ldots, c_n)$. The symbols in a message and in a codeword are chosen from a fixed alphabet of size q. A linear error-correcting code can be represented by a generator matrix G, comprising of k rows and n columns, with the property that c=xG for every message x. The length of the code is n, and k is referred to as the dimension of the code. If a codeword c is transmitted, and the received codeword equals r, then a decoding algorithm is used to retrieve x from r. The error-correcting capability of an error-correcting code can depend on the minimum distance of the code. The minimum distance is defined as the minimum number of symbol positions in which any two codewords differ, and is denoted by d. A code with minimum distance d can correct up to $\text{Floor}((d-1)/2)$ errors. A linear error-correcting code of length n, dimension k and minimum distance d can be referred to as an [n,k,d]q code.

A Reed-Solomon code is an [n,k,n−k+1]q code; in other words, the minimum distance d equals n−k+1. Reed Solomon codes can also be used in erasure channels, in which the code can correct any set of n-k symbol erasures (lost symbols). Further information on Reed-Solomon Codes can be found in the article Reed-Solomon Codes by Bernard Sklar, available on the Internet. Further information can be found, for example, in *Channel Codes: Classical and Modern* by Ryan, William E., Shu Lin (2009), Cambridge University Press, ISBN 978-0-521-84868-8; and in *The Art of Error Correcting Coding* by Robert H. Morelos-Zaragoza, Second Edition, John Wiley & Sons, 2006, ISBN: 0470015586.

Figure 1A:
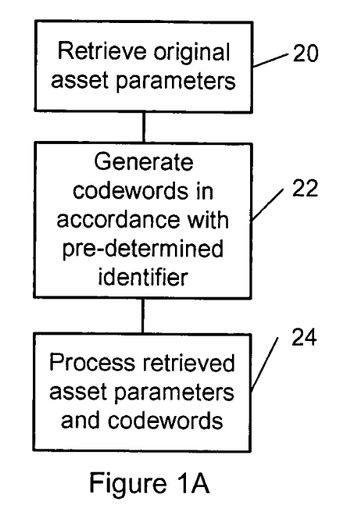
FIG. 1A shows an exemplary initialization method in accordance with the present disclosure.

FIG. 1A shows an exemplary initialization method in accordance with the present disclosure. The method of FIG. 1A shows how a fingerprint (which can also be referred to as an error-correction fingerprint) can be generated for a collection of assets present in a computer environment. This collection of assets, present at initialization, can be referred to as the original collection of assets. At step 20, the asset parameters of the original collection of assets are retrieved. At step 22, an error-correction operation is performed on a pre-determined identifier to provide codeword symbols. At step 24, a pre-determined function operates on the codewords and on the retrieved asset parameters to generated the error-correction fingerprint of the computer environment. The error-correction fingerprint is a function of the original collection of assets and of the identifier.

Figure 1B:
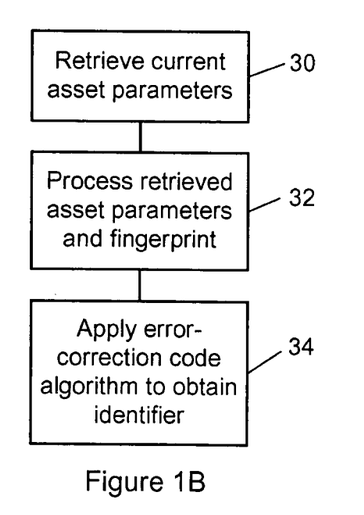
FIG. 1B shows an example of how an identifier of a computing environment can be obtained in accordance with the present disclosure.

FIG. 1B shows an exemplary method of how an identifier for a current collection of assets of a computing environment can be obtained. The computing environment has associated thereto an error-correcting fingerprint, which is a function of the asset parameters at an initialization stage where the computing environment had an original collection of assets.

At step 30, the asset parameters of the current collection of assets are retrieved. At step 32, the retrieved asset parameters and the fingerprint are processed to obtain code symbols. At step 34, an error-correction operation, for example, a Reed-Solomon error correction operation, is applied to the code symbols to obtain the identifier. If the current collection of assets is identical to the original collection of assets, then the identifier will always be correct. If the current collection of assets differs from the original collection of assets then, depending on which assets are different, on how many of the assets are different, and on the error-correction operation that was used to obtain the fingerprint, the identifier may or may not be correct.

Figure 2:
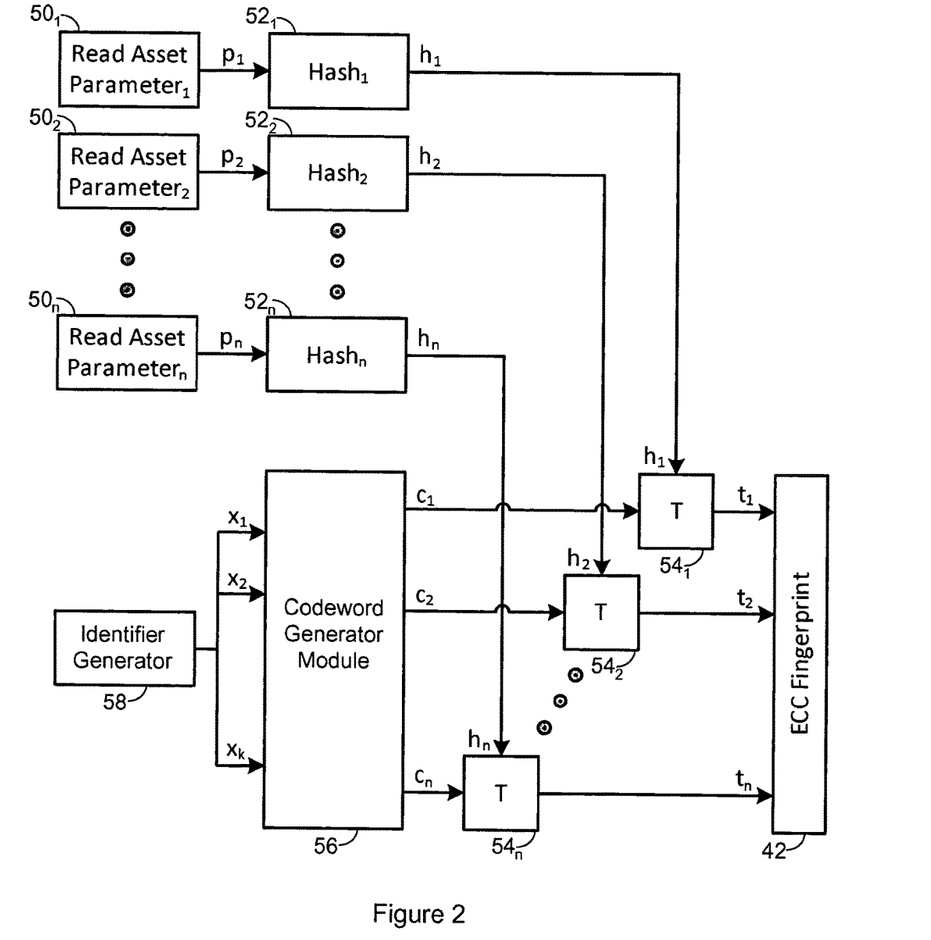
FIG. 2 shows another exemplary initialization method in accordance with the present disclosure.

FIG. 2 shows another exemplary initialization method in accordance with the present disclosure. That is, FIG. 2 shows how an error-correction fingerprint of a computing system can be calculated in accordance with the present disclosure. At steps $50_1$-$50_n$, the asset parameters $p_1$, $p_2$, ... $p_n$ are retrieved (e.g., read or otherwise obtained) from the assets within the computing environment. These assets form the original collection of assets.

At steps $52_1$-$52_n$, the retrieved asset parameters $p_1$, $p_2$, ... $p_n$ are processed through a hash function to obtain hash values $h_1$, $h_2$, ... $h_n$. Any suitable hash function can be used without departing from the scope of the present disclosure. The hash values $h_1$, $h_2$, ... $h_n$ serve as input to a transform function T, shown at steps $54_1$-$54_n$.

The other input to the transform generating function T is an error-protected codeword c defined as c=($c_1$, $c_2$, ... $c_n$). The symbols $c_1$, $c_2$, ... $c_n$ are codewords symbols generated by a codeword generator module 56 (using a codeword generation algorithm) as a function of an identifier $x_1$, $x_2$, ... $x_k$, which can be generated by an identifier generator 58. The identifier generator 58 can also be referred to as an identity message server or as a message generator. For each codeword symbol $c_i$ and hash value $h_i$, the transform function T, T=T($c_i$, $h_i$), generates a transform parameter $t_i$ as a function of the codeword symbol $c_i$. The transform parameters $t_1$, $t_2$, ... $t_n$ define the error-correcting fingerprint 42 as function of the hash values and of the codeword symbols.

As will be shown further below, the codeword generator module 56 uses a codeword generation algorithm (which can include Reed-Solomon error-code) to generate the codeword symbols as a function of the identifier. The identifier can be regarded as a unique key that is specific to a particular computing environment. The identifier can be randomly generated. In some applications, the identifier may represent a key in a public key cryptographic system, which may have some special constraints preventing the random generation of such keys. Keys that are used in the Data Encryption Standard (DES) cryptographic algorithm use 56 bits. The Advanced Encryption Standard (AES) uses 128 or 256 bit keys. The Rivest, Shamir, Adleman (RSA) algorithm uses key lengths of 2048 or 3072 bits. As such, using the above-noted encryption approaches, an identifier can range in size from around 48 to 3K bits. In general, good cryptographic algorithms require an exhaustive key search to break, so any additional bit in the key doubles the number of searches to find the key. The identifier can be generated using a random number generator and should be long enough to differentiate computing systems and to resist dictionary attack. Generally, the codeword generator algorithm and the error-correction code should be chosen in accordance with at least the identifier length, the number of asset parameters, and hash algorithms.

With respect to the initialization of an application in a computing environment, in some embodiments, an initialization portion of the application reads the asset parameters and sends them to a server. The server calculates, as a function of the asset parameters, and in accordance with a codeword generation algorithm (which can include Reed-Solomon error correction code), the error-correction fingerprint of the computing environment and returns the fingerprint to the application running in the computing environment. The server may also generate an instance of the application with the error-correction fingerprint embedded into the new application. In this case, the server sends the application instance to the computing platform (computing environment) for execution or installation. The error-correction fingerprint enables the application to convert the asset parameters into a system identifier as described in further details below.

Figure 3:
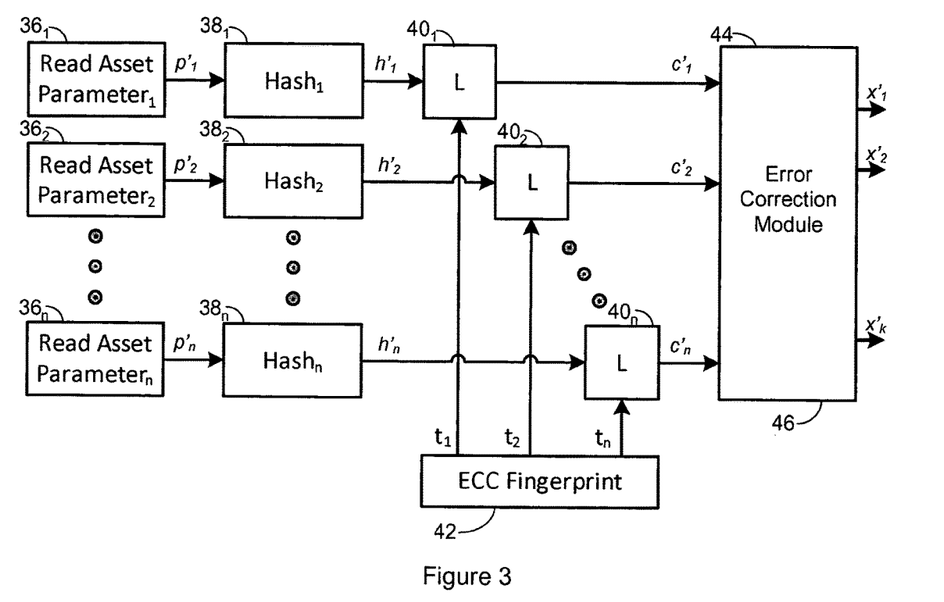
FIG. 3 shows another example of how an identifier of a computing environment can be obtained in accordance with the present disclosure.

FIG. 3 shows an implementation of the method of FIG. 1B. FIG. 3 relates to a computing environment that has n asset parameters $p'_1$, $p'_2$, ... $p'_n$. The asset parameters are retrieved (e.g., read or otherwise obtained) from the assets within the computing environment at steps $36_1$-$36_n$. At steps $38_1$-$38_n$, the retrieved asset parameters $p'_1$, $p'_2$, ... $p'_n$ are processed by a hash function to obtain hash values $h'_1$, $h'_2$, ... $h'_n$. The hash function is the same as that used at the initialization stage. The hash values will typically depend on the asset parameters. At steps $40_1$-$40_n$, the hash values $h'_1$, $h'_2$, ... $h'_n$ are mapped, by a mapping operation L, as a function of the transform parameters $t_1$, $t_2$, ... $t_n$ of the error-correction fingerprint 42, into respective code symbols $c'_1$, $c'_2$, ... $c'_n$. The pre-determined transform parameters $t_1$, $t_2$, ... $t_n$ define the error-correcting fingerprint 42 and are determined at an initialization stage such as described in the example of FIG. 2. At step 44, an error-correction module 46 applies an error-correction algorithm to the code symbols $c'_1$, $c'_2$, ... $c'_n$ to obtain the identifier $x'_1$, $x'_2$, ... $x'_n$. The error-correction algorithm can include Reed-Solomon error-correction code or any other suitable type of error-correction code. The error-correction algorithm applied by the error-correction module 46 is functionally the opposite of the codeword generation algorithm applied by codeword generator module 56 of FIG. 2.

The identifier $x'_1, x'_2, \ldots x'_n$ obtained at the output of the error-correction module 46 will be the same as the identifier $x_1, x_2, \ldots x_k$ input to the codeword generation module 56 (FIG. 2) provided the asset parameters $p'_1, p'_2, \ldots p'_n$ are the same as the asset parameters $p_1, p_2, \ldots p_n$ (FIG. 2), or provided they differ by no more than an amount acceptable to the particular error-correcting code applied by the error correction module 46 (FIG. 2). That is, provided the difference (error) in asset parameters $p'_1, p'_2, \ldots p'_n$, and $p_1, p_2, \ldots p_n$ is no larger than what can be tolerated by the error-correction module 46.

The lookup function L (at steps $40_1$-$4_n$ of FIG. 3) is configured by the transform parameters $t_i$. The resulting lookup function maps a hash value $h'_i$ to the codeword symbol $c_i$ provided the asset parameter $p'_i$ is the same as the asset parameter $p_i$ present at initialization; that is, provided $h'_i = h_i$. For other values of $h'_i$ that do not correspond to the asset parameter present at initialization, the $t_i$-configured lookup function L produces output values that are not equal to $c_i$. Special provisions can be made for generating a transform mapping function for encoding values representing absent asset parameters if the error correcting code supports them.

Figure 4:
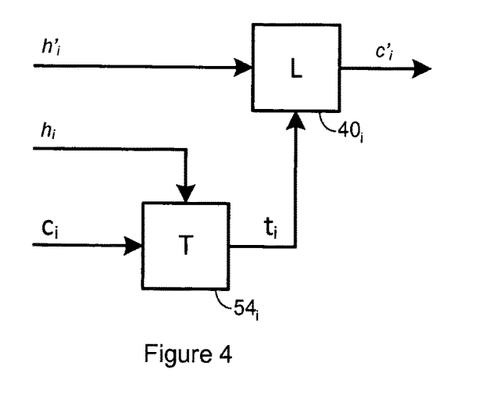
FIG. 4 shows an example of interrelationship between a transform function and a lookup function that can be used in embodiments of the present disclosure.

For some applications, it may be beneficial to implement the transform parameter generating function T as an XOR function on $h_i$ and $c_i$. Other functional representations can also be used. In general, a table lookup can represent any function. Instead of a lookup table, it is possible to actually use a calculation to generate the same result. XOR is one such operation (calculation). Alternatively, a simple addition for L and a subtraction for T can be used. An example of the relationship between the transform function T and the lookup function L is shown in FIG. 4, which shows how the transform function T ($54_i$) and the lookup function L ($40_i$) are used in conjunction. The transform function T ($54_i$) maps the codeword symbol $c_i$, and an initial hash value $h_i$, to a transform parameter $t_i$. For a value $h'_i$ the lookup function L ($40_i$) produces a code symbol $c'_i$ that is equal to the initial value of $c_i$ only if $h'_i$ is equal to $h_i$. For all other $h'_i$ values the lookup function L produces a received symbol value $c'_i$ that is different than $c_i$. That is, if an original asset present at initialization has been replaced by a replacement asset, the code symbol value corresponding to the replacement asset will be different than the codeword symbol corresponding to the original asset.

Figure 5:
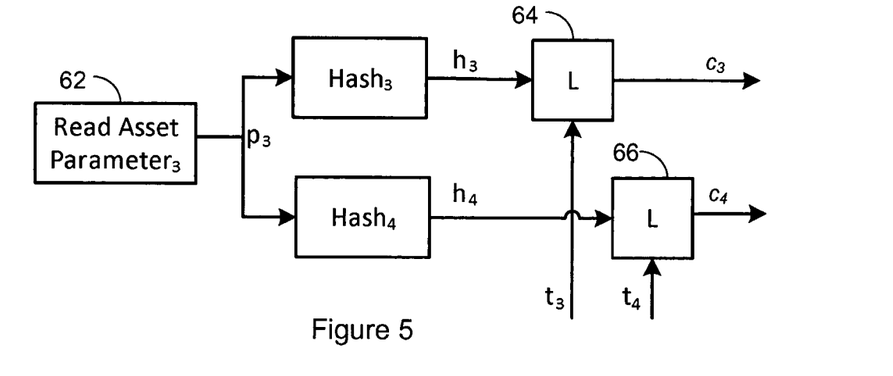
FIG. 5 shows an example of a single asset parameter providing two hash values that can be used in embodiments of the present disclosure.

In the examples of FIGS. 2 and 3, only one hash value was generated for each asset parameter. However, this need not be the case. For example, as shown at FIG. 5, it is possible for a single asset parameter $p_i$ to generate more than one hash value. In the example of FIG. 5, the asset parameter $p_3$ read at step 62 is hashed into two hash values $h_3$ and $h_4$ that can be used as separate inputs to the lookup functions 64 and 66 in order to produce, in accordance with transform parameters $t_3$ and $t_4$, the codewords $c_3$ and $c_4$, which can be used to generate an error-correction fingerprint. This can allow the assignment of different weights to the asset parameters. For example, an asset parameter that has associate thereto more than one hash value will generally have a greater role in determining a computer environment identifier than an asset parameter that has only one hash value associated thereto.

Figure 6:
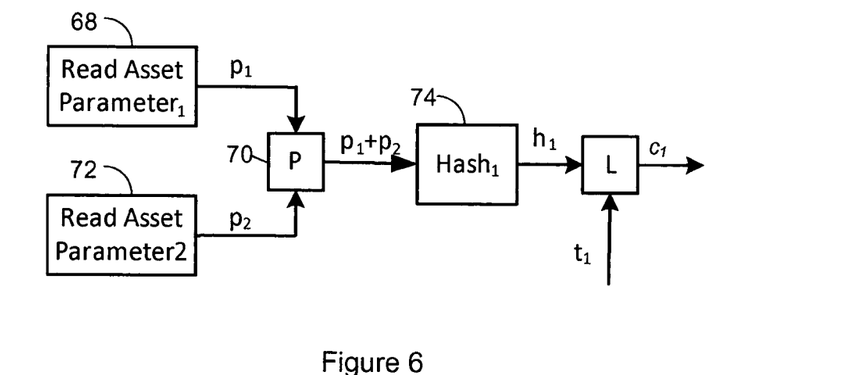
FIG. 6 shows an example of two asset parameters providing a single hash value that can be used in embodiments of the present disclosure.

Conversely, it is also possible for multiple asset parameters to generate a single hash value. For example, a hash function can be applied to a sum of asset parameters instead of being applied to the individual asset parameters. That is, $H(p_1+p_2)$ may replace the hash functions $H(p_1)$ and $H(p_2)$. Subsequent the initialization stage, a change to one or both of the assets, and thereby a change to their respective asset parameters, will generally have the same effects on the identifier recovered. An example is shown at FIG. 6 where the asset parameter $p_1$ retrieved at step 68 is summed, at step 70, with the asset parameter $p_2$ retrieved at step 72. The summed asset parameter $p_1+p_2$ is then hashed at step 74 to produce hash value $h_1$, which is input into the lookup function 75 to generate, as a function of transform parameter $t_1$ the codeword $c_1$.

Without departing from the scope of the present disclosure, an asset parameter may also be split into multiple parts before being hashed to multiple hashed parameters. There also could be substantial processing before generating a hash or after applying the hash function. Such indirect use of an error correcting module is also within the scope of the present disclosure.

Figure 7:
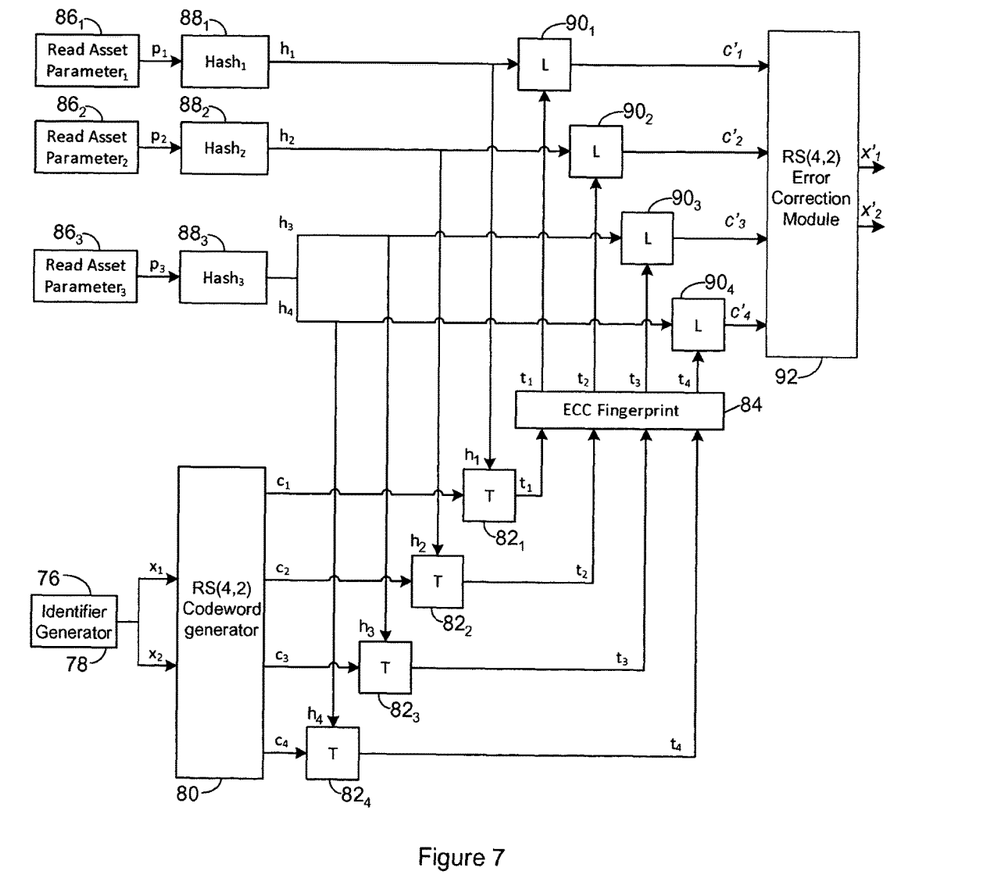
FIG. 7 shows an example of initialization and of how an identifier can be obtained in another embodiment of the method of the present disclosure.

FIG. 7 shows an example of the present disclosure with respect to an application (a software application) that relies on three assets and on a Reed-Solomon (4,2) error-error correcting code. In the present example, the application is to produce a valid result (a valid identifier) only if one essential asset is correct and if at least one of the remaining two assets are correct. An error in the essential asset or errors of both the other two assets will not provide the valid identifier and will prevent the application from providing the intended functionality. In the present example, the asset having asset parameter $p_3$ is the essential asset, and this asset parameter has associated thereto two hash values $h_3$ and $h_4$.

First described is how an error-correction fingerprint is determined for the computing asset that includes the three assets.

At step 76, an identifier generator 78 generates an identifier $x=(x_1, x_2)$, which is input into a codeword generator 80. The codeword generator 80, in this example, a codeword generator that uses a codeword generation algorithm that use Reed-Solomon (4, 2) error-correction code, outputs the codeword $c=(c_1, c_2, c_3, c_4)$ as a function of the identifier x. Each codeword symbol $c_i$ is input to a transform function T, which also has as input a hash value obtained from an original collection of assets for which the error-correction fingerprint 84 is being determined. The hash values are $h_1$, $h_2$, $h_3$, and $h_4$. As shown at FIG. 7, the asset parameter $p_3$, and hence its related asset, has associated thereto two hash values $h_3$ and $h_4$ without which a valid identifier cannot be obtained.

The transform function $82_1$ outputs the transform parameter $t_1$, the transform function $82_2$ outputs the transform parameter $t_2$, the transform function $82_3$ outputs the transform parameter $t_3$, and the transform function $82_4$ outputs the transform parameter $t_4$. The transform parameter $t_1, t_2, t_3$, and $t_4$ constitute the error-correction fingerprint 84.

In determining the identifier for the three assets, be they the original three assets used in determining the error-correction fingerprint 84 or other assets, the asset parameters $p_1$, $p_2$, and $p_3$ are retrieved at steps $86_1$-$86_3$. Hash value $h_1$ is obtained at step $88_1$, as a function of asset parameter $p_1$. Hash value $h_2$ is obtained at step $88_2$, as a function of asset parameter $p_2$. Hash values $h_3$ and $h_4$ are obtained at step $88_3$, as a function of asset parameter $p_3$.

Subsequently, each hash value $h_i$, (i=1 to 4) and a corresponding transform parameter $t_i$, are input into a lookup function $L(h_i, t_i)$, which outputs a code symbol $c'_i$. This is shown at steps $90_1$-$90_4$. The code symbol $c'_i$ will be identical to the codeword symbol $c_i$ only if the asset parameter used to determine $c'_i$ is the same as that used to determine the transform parameter $t_i$. The code symbols $c'_1$, $c'_2$, $c'_3$, and $c'_4$ are input into an error-correction module 92 (a Reed-Solomon (4,2) error correction module), which outputs an identifier $x'=(x'_1, x'_2)$. The identifier $x'$ will be equal to $x=(x_1, x_2)$ only if $c'_3=c_3$ and $c'_4=c_4$, and if at least $c'_1=c_1$ or $c'_2=c_2$.

FIG. 7 also shows the use of an RS(4,2) error-correction module 92, which uses an error-correction algorithm based on Reed-Solomon error-correction code. The essential asset parameter $p_3$ is used to generate two hash values $h_3$ and $h_4$. As the RS(4,2) code of the error-correction module 92 can correct one error symbol, the essential asset parameter $p_3$ needs to be correct in order for the RS(4,2) error correction module 92 to produce a valid output. If $p_3$ is correct, one of the remaining hash parameters ($h_1$ or $h_2$) may be incorrect as the RS(4,2) error correction module 92 can recover from that error.

The identifier $x=(x_1, x_2)$ may be common to multiple computing platforms (computing environments). In such cases, end-users can obtain identical copies of a program (application program), but do require a computing platform specific to the error-correction fingerprint to generate the identifier x.

It may be advantageous in some applications to recover the identifier using assets that are intentionally different from those used at initialization. As the error correcting code tolerates a certain amount of wrong asset parameters, this approach could be used to complicate attacks against the system. The error correction module may give an indication of the number of incorrect symbols that can be tolerated by the application. Adjustment to the number of intentionally wrong inputs at recovery can be made accordingly.

Instead of reading asset parameters, some computing platforms (computing environments) can support a challenge-response device (function) such as, for example, a Physical Unclonable Function, a dongle, a smart card, etc. For an asset associated with such a challenge-response device, the exemplary identifying message recovery method of FIG. 3 can be adapted to issue challenges to the challenge-response device and to process the responses.

Figure 8:
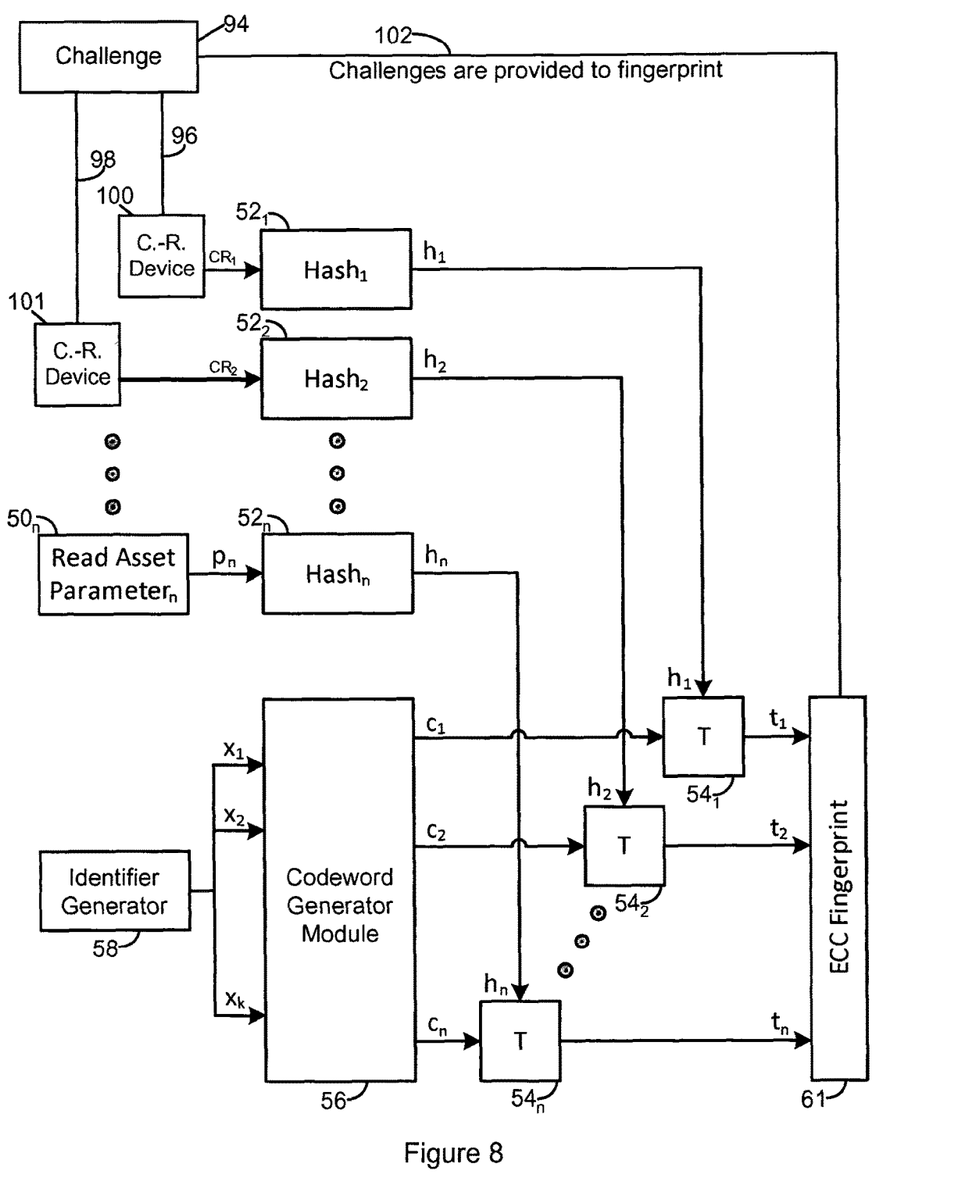
FIG. 8 shows another exemplary initialization method in accordance with the present disclosure.

During the initialization phase, that is, at the time of establishing the error-correction fingerprint, a number of challenges and the corresponding response are obtained and used to generate the error-correction fingerprint. FIG. 8 shows an initialization example similar to the example of FIG. 2 but where instead of reading asset parameters $p_1$ and $p_2$, a challenge device (function) 94 provides two challenges to two challenge-response devices 100 and 101 to obtain responses $CR_1$ and $CR_2$. As will described below, the responses $CR_1$ and $CR_2$ are subsequently treated as asset parameters and, as such, can be referred to as such. That is, the responses $CR_1$ and $CR_2$ constitute asset parameters. The challenge-response devices 100 and 101 can each be associated with a different asset of the computing environment.

The challenge device 94 provides a first challenge 96 to the challenge-response device 100. In response, the challenge-response device 100 provides a response $CR_1$ to the hash function $52_1$, which produces the hash value $h_1$. The challenge device 94 also provides a second challenge 98 to the challenge-response device 101, which in turn provides a response $CR_2$ to the hash function $52_2$. The hash function $52_2$ produces the hash value $h_2$. As such, $CR_1$ and $CR_2$ are treated as asset parameters by the hash functions. In the present example, hash values other than $h_1$ and $h_2$ are obtained by retrieving corresponding asset parameters such as at step $50_n$, which provides asset parameter $p_n$, and providing the asset parameters to their respective hash function. The hash values $h_1, h_2, \ldots h_n$ are provided to a transform function T. The other input to the transform function T is an error-protected codeword c defined as $c=(c_1, c_2, \ldots c_n)$. The symbols $c_1, c_2, \ldots c_n$ are codewords symbols generated by a codeword generator module 56 as a function of the identifier $x_1, x_2, \ldots x_k$, which can be generated by the identifier generator 58. The transform function $T=T(c_i, h_i)$, generates a transform parameter $t_i$ as a function of the codeword symbol $c_i$ and of the hash value $h_i$. The transform parameters $t_1, t_2, \ldots t_n$ are comprised in the error-correcting fingerprint 61.

As will be understood by the skilled worker, any number of hash values can be obtained by processing responses from a challenge-response device. For example, all the hash values can be obtained by processing responses from a challenge-response device or, as in the example of FIG. 8, only a portion of the entire number of hash values can be obtained by processing responses from a challenge-response device.

In addition to comprising the transform parameters $t_1, t_2, \ldots t_n$, the error-correction fingerprint 61 can include the same challenges as the ones used to obtain the response. That is, in the example of FIG. 8, the challenges 96 and 98 will be part of the error-correction fingerprint 61, which will be able to issue those challenges when identifying a computing environment. The provision of the challenges 96 and 98 to the error-correction fingerprint 61 is shown at 102.

Figure 9:
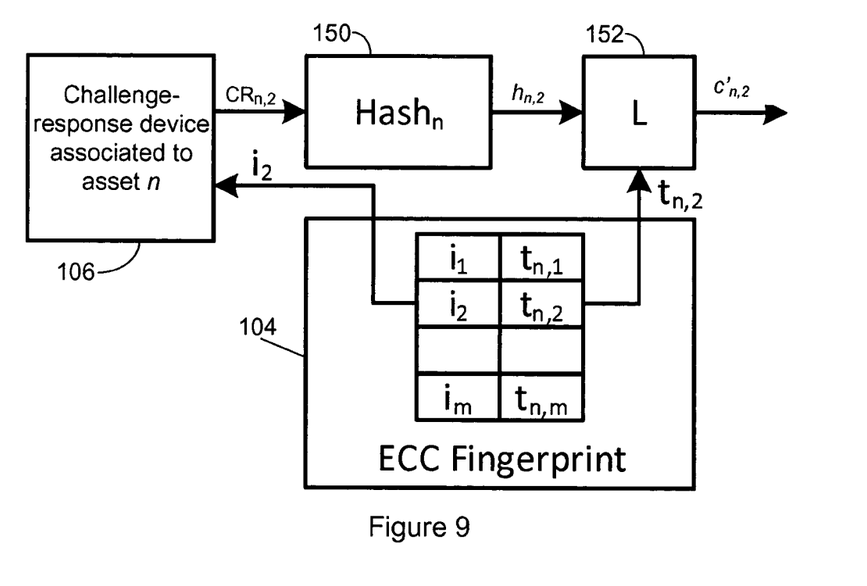
FIG. 9 shows an exemplary error-correcting fingerprint that includes challenges to be provided to a challenge-response device that can be used in embodiments of the present disclosure.

FIG. 9 shows an error-correction fingerprint 104 used in generating code symbols that can be used to obtain an identifier. The error-correction fingerprint 104 is operationally connected to a challenge-response device (function) 106. The challenge-response device (function) 106 of the present example is associated to an asset n of the computing environment. The error-correction fingerprint 104 comprises m transform parameters t and m challenges i. FIG. 9 shows the challenge-response device 106 receiving a challenge $i_2$ from the error-correction fingerprint 104, and, in response to the challenge $i_2$, providing a response $CR_{n,2}$ to the hash function 150, which outputs a hash value $h_{n,2}$ to a lookup function 152. The lookup function also receives as input a transform parameter $t_{n,2}$ from the error-correction fingerprint 104 and, outputs a code symbol $c'_{n,2}$ to an error-correction module (not shown).

In the present example, the challenge-response device 106 is to provide a response to each challenge submitted by the error-correction fingerprint 104. The challenge-response device 106 provides the m responses $CR_{n,1}, CR_{n,2}, \ldots CR_{n,m}$ to the hash function 150. Each response is transformed into a hash value ($h_{n,1}, h_{n,2}, \ldots h_{n,m}$). The hash values and the transform parameters ($t_{n,1}, t_{n,2}, \ldots t_{n,m}$ comprised in the error-correction fingerprint 104) are input to a lookup function L, which outputs code symbols ($c'_{n,1}, c'_{n,2}, c'_{n,m}$). The code symbols which are provided to an error-correction module (not shown).

In scenarios where the computing environment relies on obtaining responses from a challenge-response device as well as on retrieving asset parameters, the error-correction fingerprint will also include transform parameters for which there are no associated challenges.

Another application of the present disclosure is to use the identifier (identifying message) as a key that can be used in a cryptographic operation. The key recovery requires the right error-correction fingerprint which will decode to the intended key on the computing platform with a sufficient number of correct asset parameter values.

In the preceding description, for purposes of explanation, numerous details are set forth in order to provide a thorough understanding of the embodiments. However, it will be apparent to one skilled in the art that these specific details are not required.

In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method to obtain an identifier for a current collection of assets associated with a computing environment, the method comprising:
    obtaining current asset parameters, each current asset parameter being a parameter of a respective asset of the current collection of assets;
    processing the current asset parameters and a fingerprint in accordance with a pre-determined function to obtain codeword symbols for the identifier, wherein the pre-determined function maps the current asset parameters and the fingerprint to the codeword symbols of the identifier the fingerprint being associated with the computing environment, the fingerprint being based on an original collection of assets of the computing environment and codeword symbols for an original identifier, wherein the codeword symbols for the original identifier are codeword symbols of an error-correction algorithm; and
    applying the error-correction algorithm to the codeword symbols for the identifier to obtain the identifier.

2. The method of claim 1 wherein the pre-determined function includes converting each current asset parameter to at least one hash value to obtain a series of hash values.

3. The method of claim 2 wherein the pre-determined function further includes mapping the series of hash values to the codeword symbols in accordance with the fingerprint.

4. The method of claim 3 wherein:
    the fingerprint has associated thereto transform parameters; and
    mapping the series of hash values to the codeword symbols is effected in accordance with the transform parameters.

5. The method of claim 4 wherein mapping the series of hash values to the codeword symbols includes performing an XOR operation between the series of hash values and the transform parameters.

6. The method of claim 1 wherein:
    at least one of the assets has associated thereto a challenge-response device; and
    obtaining the current asset parameters includes:
    providing at least one challenge to the challenge-response device; and
    receiving, from the challenge-response device, a response for each of the at least one challenge, each response constituting a current asset parameter.

7. The method of claim 6 wherein the challenge-response device includes at least one of a Physical Unclonable Function device, a dongle, and a smart card.

8. The method of claim 1 wherein the error-correction algorithm includes a Reed-Solomon error-correcting code.

9. A method of defining a fingerprint for a computing environment having associated thereto an original collection of assets, the method comprising:
    generating codeword symbols in accordance with a codeword generation algorithm wherein said codeword generation algorithm includes performing an error-correction algorithm on an identifier, the codeword symbols being codeword symbols of the error-correction algorithm; and
    processing asset parameters and the codeword symbols in accordance with a pre-determined function to obtain the fingerprint, each asset parameter being a parameter of a respective asset the original collection of assets, wherein the pre-determined function maps the asset parameters and the codeword symbols to the fingerprint.

10. The method of claim 9 wherein generating codeword symbols includes providing the identifier as an input to the codeword generation algorithm.

11. The method of claim 9 wherein processing is preceded by accessing the assets to obtain the asset parameters there from.

12. The method of claim 9 wherein processing includes converting each asset parameter to at least one hash value to obtain a series of hash values.

13. The method of claim 12 wherein:
    the fingerprint includes a series of transform parameters; and
    the pre-determined function maps the series of hash values to the series of transform parameters in accordance with the codeword symbols.

14. The method of claim 9 wherein processing is preceded by obtaining the asset parameters.

15. The method of claim 14 wherein:
    at least one of the assets has associated thereto a challenge-response device; and
    obtaining the asset parameters includes:
    providing at least one challenge to the challenge-response device; and
    receiving, from the challenge-response device, a response for each of the at least one challenge, each response constituting an asset parameter.

16. The method of claim 15 wherein the challenge-response device includes at least one of a Physical Unclonable Function device, a dongle, and a smart card.

17. The method of claim 9 wherein the error-correction algorithm uses a Reed-Solomon error-correction code.

18. A tangible, non-transitory computer-readable medium containing instructions, which when executed by a processor cause the processor to perform a method to obtain an identifier for a current collection of assets associated with a computing environment, the method comprising:
obtaining current asset parameters, each current asset parameter being a parameter of a respective asset of the current collection of assets;
processing the current asset parameters and a fingerprint in accordance with a pre-determined function to obtain codeword symbols for the identifier wherein the pre-determined function maps the current asset parameters and the fingerprint to the codeword symbols of the identifier, the fingerprint being associated with the computing environment, the fingerprint being based on an original collection of assets of the computing environment and codeword symbols for an original identifier, wherein the codeword symbols for the original identifier are codeword symbols of an error-correction algorithm; and
applying the error-correction algorithm to the codeword symbols for the identifier to obtain the identifier.

19. The computer-readable medium of claim 18 wherein the pre-determined function includes converting each current asset parameter to at least one hash value to obtain a series of hash values.

20. The computer-readable medium of claim 19 wherein the pre-determined function further includes mapping the series of hash values to the codeword symbols in accordance with the fingerprint.

21. The computer-readable medium of claim 20 wherein:
the fingerprint has associated thereto transform parameters; and
mapping the series of hash values to the codeword symbols is effected in accordance with the transform parameters.

22. The computer-readable medium of claim 21 wherein mapping the series of hash values to the codeword symbols includes performing an XOR operation between the series of hash values and the transform parameters.

23. The computer-readable medium of claim 18 wherein:
at least one of the assets has associated thereto a challenge-response device; and
obtaining the current asset parameters includes:
providing at least one challenge to the challenge-response device; and
receiving, from the challenge-response device, a response for each of the at least one challenge, each response constituting a current asset parameter.

24. The computer-readable medium claim 23 wherein the challenge-response device includes at least one of a Physical Unclonable Function device, a dongle, and a smart card.

25. The computer-readable medium of claim 18 where in the error-correction algorithm includes a Reed-Solomon error-correcting code.

26. A tangible, non-transitory computer-readable medium containing instructions,
which when executed by a processor cause the processor to perform a method to define a fingerprint for a computing environment having associated thereto an original collection of assets, the method comprising:
generating codeword symbols in accordance with a codeword generation algorithm wherein said codeword generation algorithm includes performing an error-correction algorithm on an identifier, the codeword symbols being codeword symbols of the error-correction algorithm; and
processing asset parameters and the codeword symbols in accordance with a pre-determined function to obtain the fingerprint, each asset parameter being a parameter of a respective asset of the original collection of assets, wherein the pre-determined function maps the asset parameters and the codeword symbols to the fingerprint.

27. The computer-readable medium of claim 26 wherein generating codeword symbols includes providing the identifier as an input to the codeword generation algorithm.

28. The computer-readable medium of claim 26 wherein processing is preceded by accessing the assets to obtain the asset parameters there from.

29. The computer-readable medium of claim 26 wherein processing includes converting each asset parameter to at least one hash value to obtain a series of hash values.

30. The computer-readable medium of claim 29 wherein:
the fingerprint includes a series of transform parameters; and
the pre-determined function maps the series of hash values to the series of transform parameters in accordance with the codeword symbols.

31. The computer-readable medium of claim 26 wherein processing is preceded by obtaining the asset parameters.

32. The computer-readable medium of claim 31 wherein:
at least one of the assets has associated thereto a challenge-response device; and
obtaining the asset parameters includes:
providing at least one challenge to the challenge-response device; and
receiving, from the challenge-response device, a response for each of the at least one challenge, each response constituting an asset parameter.

33. The computer-readable medium of claim 31 wherein the challenge-response device includes at least one of a Physical Unclonable Function device, a dongle, and a smart card.

34. The computer-readable medium of claim 26 wherein the error-correction algorithm uses a includes Reed-Solomon error-correction code.

\* \* \* \* \*